United States Patent [19]

Sukle

[11] 4,051,922

[45] Oct. 4, 1977

[54] LUBRICATING SYSTEM FOR BEARINGS

[76] Inventor: Vincent F. Sukle, Oakwood Village (c/o Wean United, Inc., 948 Fort Duquesne Blvd., Pittsburgh, Pa. 15222)

[21] Appl. No.: 604,279

[22] Filed: Aug. 13, 1975

[51] Int. Cl.² .................. F01M 11/02; F16N 7/36; F16N 21/00
[52] U.S. Cl. .................................. 184/7 R; 57/67; 184/7 A; 184/11 A
[58] Field of Search .............. 72/44, 45; 57/6, 7, 57/9, 67, 58.32, 58.52, 58.78; 184/6, 6.14, 6.28, 7 R, 7 A, 8, 9, 10, 11 A, 12

[56] References Cited

U.S. PATENT DOCUMENTS

| 2,178,662 | 11/1939 | Hanson | 184/8 |
|---|---|---|---|
| 2,794,517 | 6/1957 | Keith | 184/10 |
| 2,896,394 | 7/1959 | Johnson | 57/67 |
| 3,018,605 | 1/1962 | Sherrill | 184/7 A |
| 3,566,596 | 3/1971 | Pennycuick | 57/6 |
| 3,720,054 | 3/1973 | Haehnel | 57/9 |
| 3,827,465 | 8/1974 | Loy | 57/34 R |

FOREIGN PATENT DOCUMENTS

| 59,484 | 6/1938 | Norway | 72/44 |

*Primary Examiner*—Stephen C. Bentley
*Assistant Examiner*—Thomas H. Webb

[57] ABSTRACT

In an improved system for lubricating flyer sheave bearings of a wire buncher or like machine, consisting of a collecting ring wherein the lubricant is deposited into grooves of this ring, and by centrifugal force is conveyed to the bearings of a sheave located on the outer periphery of a flying disc.

In present day strand wire forming machines, sometimes referred to as "buncher machines", it is a common practice to employ grooved wheels or pulleys, referred to as "flying sheaves". These sheaves are mounted on the periphery of large, high velocity rotating discs or arms in which the sheaves are supported for rotation by bearings of one type or another. This design has created a serious problem in bearing performance, due particularly to the fact that an adequate system for keeping the bearings properly lubricated has yet to be found. As may be expected, because of their geographical location relative to the center of rotation and the rotational speed of the disc, any lubricant applied to the bearings is cast off by centrifugal force.

6 Claims, 3 Drawing Figures

LUBRICATING SYSTEM FOR BEARINGS

It is, therefore, an object of the present invention to provide an economical and reliable lubricating system for bearings and similar devices that must act under the influence of detrimental centrifugal forces.

It is a further object of the invention to provide a collecting means, such as a ring, secured with respect to the rotatable shaft of a machine, such as a wire buncher, wherein lubricant is collected from a stationary supply source and positively fed to outer located bearings of the flyer sheave by centrifugal force.

It is another object of the present invention with reference to the immediate previous object to provide for a constant controlled supply of lubricant to the bearings.

A further object is to provide for a buncher machine stationary tube means, so constructed and arranged so that its one end terminates in a manner so as to discharge lubricant into the concentric groove of the collecting ring, and rotatable tube means carried by and communicating with the groove of the collecting ring, but arranged on the opposite side of the ring, extending radially outwardly of the flying disc, and terminating adjacent the flyer sheave, the arrangement being such that the lubricant collected by the ring is forced by centrifugal force through the rotatable tube means to the flyer sheave bearings.

A still further object of the present invention with reference to the immediate previous object, is to provide for stationarily mounting a lubricant reservoir and a solenoid-needle valve arrangement in a manner that the lubricant is fed by gravity to the collecting ring by the stationary tube means.

These objects, as well as other novel features and advantages of the present invention, will be better appreciated and understood when the following description is read along with the accompanying drawings of which:

Figure 1:
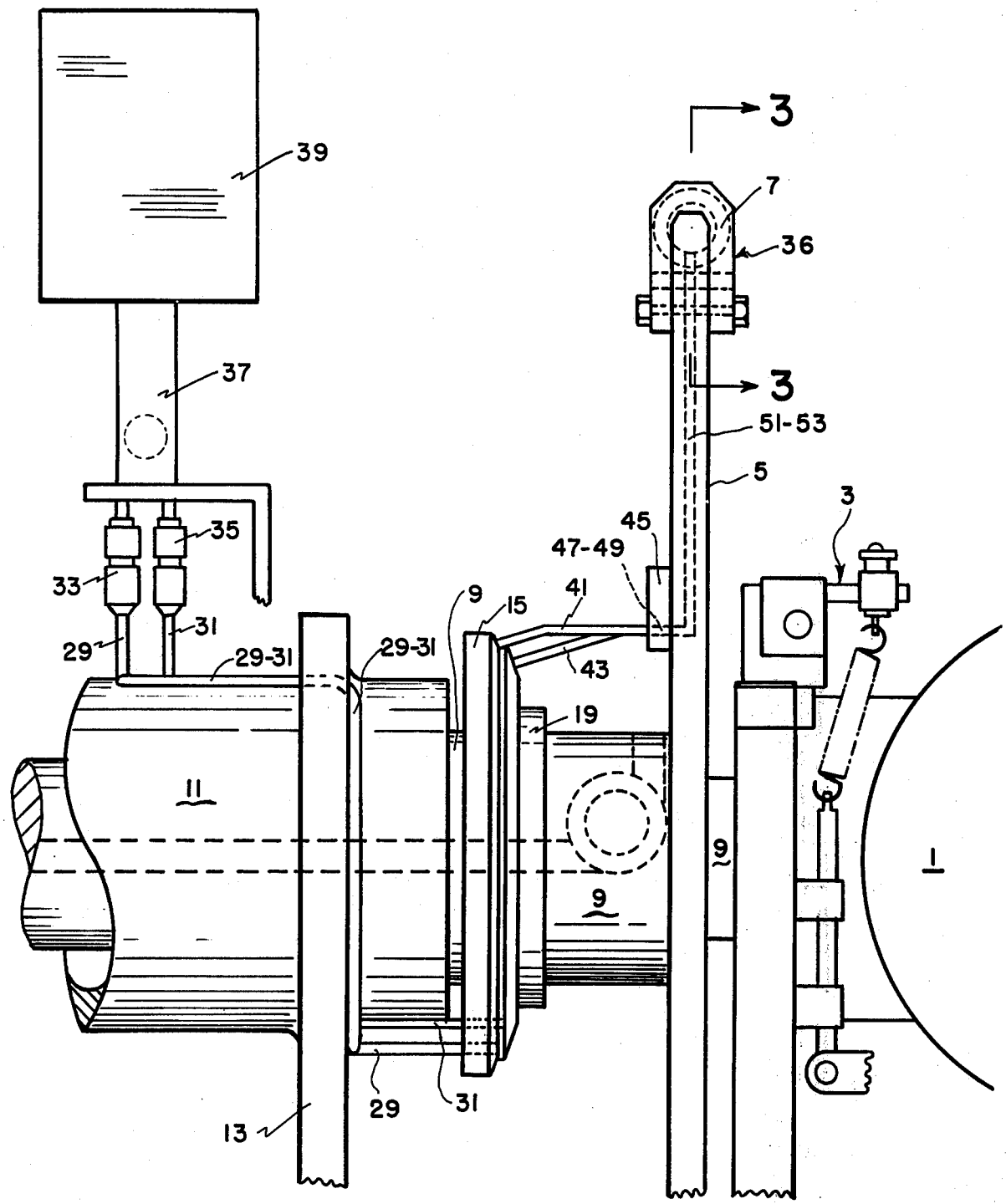
FIG. 1 is a front view illustrating an arrangment of an improved system for lubricating sheave bearings of a wire buncher.

With reference to FIG. 1, there is shown only some of the principal elements of the buncher machine, since a complete showing appears in co-pending U.S. patent application Ser. No. 524,168, filed on Nov. 15, 1974, in the name of Jesse C. Bittman. The elements that are shown in FIG. 1 consist of one of the several spools 1, its braking assembly 3, the flyer disc 5, and of course, its flyer sheave 7. The flyer disc 5 is mounted for rotation with a shaft 9 of the machine, the shaft 9 being rotatably carried by a stationary tubular housing 11, supported by an upright stand 13. Actually, FIG. 1 shows only the left hand assembly of the buncher machine, the right hand side being similarly constructed from which the wire is fed to the flyer sheave 7, taken into the shaft 9, and hence, to a windup assembly for coiling.

Figure 2:
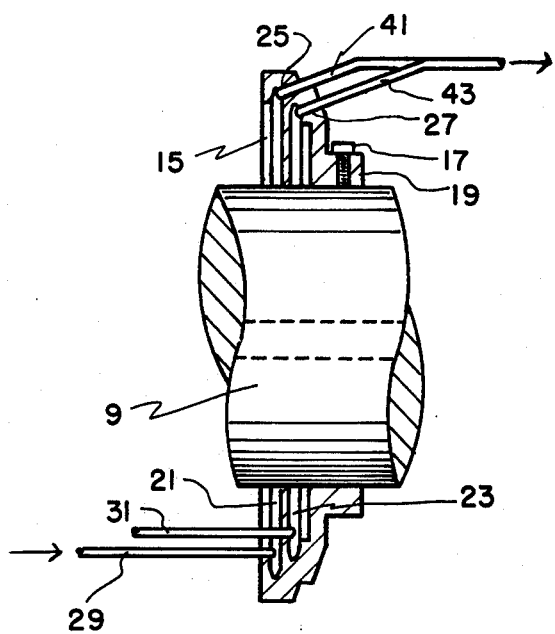
FIG. 2 is a sectional view of the collecting ring and its associated tubes shown in FIG. 1.

In still referring to FIG. 1, and in addition, FIG. 2, a lubricant collecting ring 15 is rotatably mounted around the shaft 9 by a screw 17 set into its collar 19, only shown in FIG. 2. This ring 15 has two internal recessed grooves 21 and 23. Groove 23 is displaced axially of groove 21 and is slightly smaller in diameter, but holds substantially the same amount of lubricant. It will be noted that grooves 21 and 23 are completely opened on the shaft hand side as one views these FIGURES, and a lubricant source is associated with each of these grooves. At the top of ring 15 and associated with recessed grooves 21 and 23 are two drilled holes 25 and 27, more about which will be said later.

At the bottom of ring 15, there are provided tubes 29 and 31 which form the lubricant source mentioned above, and which terminate adjacent the recessed grooves 21 and 23 at the open end of ring 15, but do not physically contact the inner walls of the grooves. As shown in FIG. 1, these tubes 29 and 31 extend parallel along the bottom, up along the side, and along the top of the tubular housing 11.

Associated with these tubes are manually operated needle valves 33 and 35, whose openings are adjustable to release an amount of lubricant needed to lubricate a flyer sheave assembly 36, according to the range of speed of the rotating shaft 9. Mounted above needle valves 33 and 35 is a solenoid valve 37, which supplies from a reservoir 39 lubricant, such as oil or grease, to the needle valves. These needles valves 33 and 35 and solenoid valve 37 are commodities well-known to industry. It will be appreciated that the construction and arrangement of reservoir 39, solenoid valve 37, the needle valves 33 and 35, tubular housing 11, and tubes 29 and 31 are such that these elements are stationarily mounted, thus eliminating a large rotating mass and the power required to rotate this mass.

Returning to ring 15, and more particularly to its two drilled holes 25 and 27, mounted therein are two tubes 41 and 43, tube 41 in hole 25 and tube 43 in hole 27 (best shown in FIG. 2). As shown clearly in FIG. 1, these tubes 41 and 43 terminate adjacent a support block 45, which has corresponding parallel drilled holes 47 and 49, and which is mounted to flyer disc 5. This disc 5, in turn, has two corresponding parallel drilled holes 51 and 53 commencing outwardly of its center and extending radially to its periphery to a point adjacent the flyer sheave assembly 36.

Figure 3:
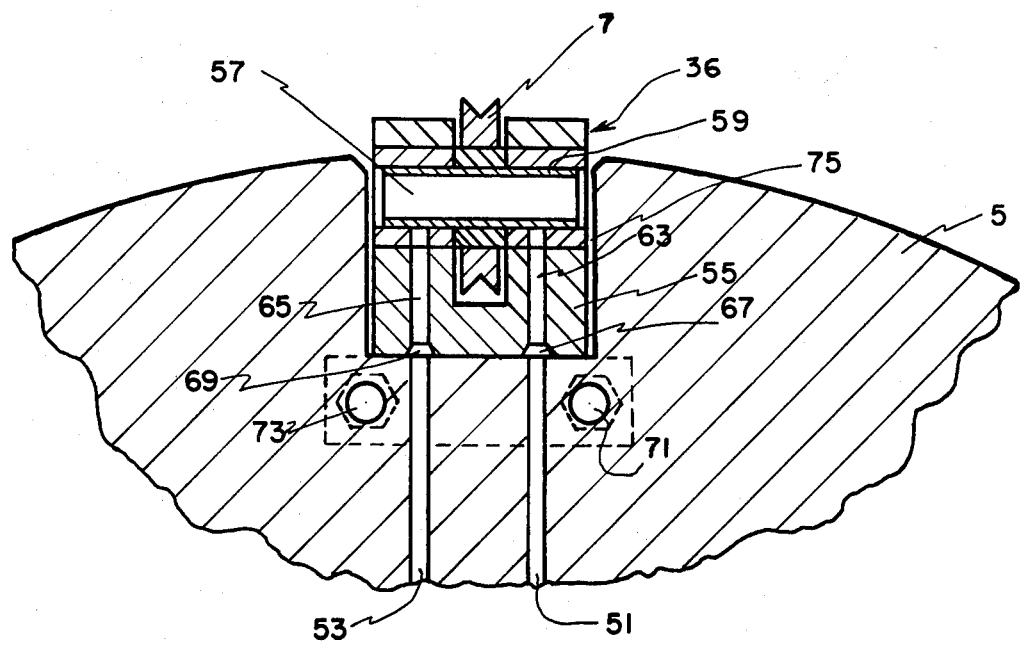
FIG. 3 is an enlarged, sectional view of the flyer sheave assembly taken on lines 3—3 of FIG. 1.

Referring to FIG. 3, in assembly 36, which consists of a plate 55, having flyer sheave 7 rotatably mounted on a horizontal shaft 56 supported in bearing 59, are two parallel drilled holes 63 and 65 connected to drilled holes 51 and 53 of disc 5. Between hole 63 and 51 is a chamfer 67, and between hole 65 and 53 is chamfer 69. Two bolts 71 and 73 securely mount the assembly 36 to a recessed portion 75 of flyer disc 5.

On operating the wire buncher machine, it will be assumed that the needle valves 33 and 35 have been set for the particular speed at which the machine will be operated. Before operation commences, solenoid valve 37 is operated to allow lubricant to pass from reservoir 39 to the needle valves. These needle valves 33 and 35, by gravity, feed a constant controllable amount of lubricant into tubes 29 and 31. The tubes 29 and 31, in turn, by gravity convey the lubricant to the adjacent concentric grooves 21 and 23. This lubricant, by centrifugal force generated by the rotation of ring 15, is forced through holes 25 and 27 into tubes 41 and 43 and into drilled holes 47 and 49 of the support block 45. Still by centrifugal force, the lubricant is forced through drilled holes 51 and 53 of flyer disc 5, and is conveyed into its outer periphery through drilled holes 63 and 65 of flyer sheave assembly 36 to two different locations of the bearing 59 of the flyer sheave 7. Upon completion of the operation of the machine, solenoid valve 37 is operated to shut off the flow of lubricant going to tubes 29 and 31.

As mentioned previously, the right hand side of the wire buncher machine, which is not shown, is similar in construction to the left hand assembly shown and is provided with its own lubricating system for the flyer sheave assembly thereof. Consequently, the bearings of both flyer sheave assemblies will be lubricated simultaneously. It should be noted that if desired, several bearings may be lubricated simultaneously from one collecting ring.

In accordance with the provisions of the patent statutes, I have explained the principle and operation of my invention and have illustrated and described what I consider to represent the best embodiment thereof.

I claim:

1. An improved lubricating system for a wire buncher or similar machine for supplying lubricant to a flyer sheave bearing thereof, said buncher having a rotating shaft to which a flyer disc is secured and to which a flyer sheave is outwardly radially mounted, comprising:
   a stationary tube means,
   means for collecting lubricant, said means incuding a lubricant collecting ring rotatable with said shaft,
   said stationary tube means being so constructed and arranged that its one end receives lubricant from a stationary supply and its other end terminates in a manner to discharge lubricant into said ring and,
   a rotatable passage means providing lubricant communication with said ring for receiving said lubricant discharged therein, at least a portion of said rotatable passage means extending radially outward relative to of said flyer disc and terminating adjacent said flyer sheave, the arrangement being such that lubricant collected by said ring is forced by centrifugal force through said rotatable passage means to said flyer sheave bearing.

2. An improved lubricating system according to claim 1, wherein said stationary tube means has at least one tube for delivering lubricant to said ring,
   a needle valve stationarily mounted and associated with said tube for feeding a controllable amount of lubricant to said tube in accordance with the range of speed of said rotating shaft,
   said stationary supply comprising a reservoir, and
   a solenoid valve stationarily mounted and operable to permit lubricant to pass from said reservoir to said needle valve.

3. An improved lubricating system according to claim 1, wherein said ring has an open end with an internal concentric groove for collecting said lubricant, arranged so that said stationary tube means extends into said open end of said ring in a manner to discharge lubricant into said groove without contacting said ring.

4. An improved lubricating system according to claim 3, wherein said rotatable tube means includes at least one tube for receiving said lubricant and arranged on the side opposite said open end of said ring, and communicating with said concentric groove of said ring.

5. An improved lubricating system according to claim 1, wherin said ring has an open end with an internal concentric groove for collecting said lubricant, arranged so that said stationary tube means extends into said open end of said ring,
   a needle valve stationarily mounted and associating with said tube for feeding a controlled amount of lubricant to said tube in accordance with the range of speed of said rotating shaft,
   said stationary supply comprises a reservoir, and
   a solenoid valve stationarily mounted and operable to permit lubricant to pass from said reservoir to said needle valve, and
   wherein said rotatable passage means includes at least one tube for receiving said lubricant mounted in and arranged on the side opposite said open end of said ring and communicating with said concentric groove of said ring.

6. An improved lubricating system according to claim 5, wherein said open end of said ring has at least two concentric grooves, one groove being slightly smaller in diameter but capable of maintaining substantially the same amount of lubricant as the other concentric groove,
   wherein said stationary tube means has at least two tubes for delivering lubricant to said ring,
   said tubes being arranged in juxtaposition in which an inner tube is in lubricant communication with said slightly smaller diameter groove and an outer tube is in lubricant communication with a larger groove,
   said two stationary tubes each terminating adjacent a different one of said concentric grooves of said ring, being so constructed and arranged that lubricant is discharged into said grooves on said open end without contacting said ring,
   said needle valve being stationarily mounted and in lubricant communication with each of said tubes for feeding a controllable amount of lubricant to said tubes in accordance with the speed of said rotating shaft, and
   wherein said rotatable tube means has at least two tubes for receiving said lubricant, mounted in and arranged on said opposite side of said open end of said ring,
   said two rotatable tubes each communicating with a different one of said concentric grooves of said ring in a manner to transport said discharged lubricant from said ring to different sides of said bearing.

* * * * *